(12) United States Patent
Fiske (10) Patent No.: US 8,209,513 B2
(45) Date of Patent: Jun. 26, 2012

(54) DATA PROCESSING SYSTEM WITH APPLICATION-CONTROLLED ALLOCATION OF FILE STORAGE SPACE

(75) Inventor: Robert Stewart Fiske, Hopedale, MA (US)

(73) Assignee: Autonomy, Inc., San Francisco, CA (US)

( * ) Notice: Subject to any disclaimer, the term of this patent is extended or adjusted under 35 U.S.C. 154(b) by 439 days.

(21) Appl. No.: 12/616,851

(22) Filed: Nov. 12, 2009

(65) Prior Publication Data

US 2011/0113207 A1    May 12, 2011

(51) Int. Cl.
G06F 12/06 (2006.01)
(52) U.S. Cl. .................. 711/170; 711/171; 711/112
(58) Field of Classification Search .................. None
See application file for complete search history.

(56) References Cited

U.S. PATENT DOCUMENTS

| | | | |
|---|---|---|---|
| 5,218,695 A | 6/1993 | Noveck et al. | |
| 5,481,702 A | 1/1996 | Takahashi | |
| 5,761,536 A * | 6/1998 | Franaszek | 710/68 |
| 5,946,686 A | 8/1999 | Schmuck et al. | |
| 2005/0066095 A1 | 3/2005 | Mullick et al. | |
| 2005/0108296 A1 | 5/2005 | Nakamura et al. | |
| 2006/0041718 A1* | 2/2006 | Ulrich et al. | 711/114 |
| 2007/0022148 A1 | 1/2007 | Akers et al. | |
| 2007/0260842 A1 | 11/2007 | Faibish et al. | |

* cited by examiner

Primary Examiner — Than Nguyen (57) ABSTRACT

A data processing system stores data in a data file by first identifying the data file as a large file type known to require an amount of storage space substantially greater than a system allocation unit size. As data is to be written to the data file beginning at a location identified by a file pointer, the system determines whether it is necessary to allocate storage space of the data processing system to store the data to be written, and if so then commands are issued to the file system including (i) one or more first commands to set an end of file marker for the data file to a new value greater than a current value of the end of file marker by at least an application allocation unit size which is at least twice the system allocation unit size, and (ii) one or more second commands to mark a region of the data file extending between the current and new values of the end of file marker as holding valid data. Subsequently the data is written to the data file at the location identified by the file pointer.

12 Claims, 5 Drawing Sheets

DATA PROCESSING SYSTEM WITH APPLICATION-CONTROLLED ALLOCATION OF FILE STORAGE SPACE

BACKGROUND

In data processing systems, data used by application programs and operating systems is stored in data files on storage devices such as magnetic disk drives. Files are generally treated as linear arrays of data elements, typically bytes. File operations such as reading and writing employ a pointer and a length value to identify a starting location and amount of data to be read from or written to the file.

When data is written to a file, the file system allocates storage space on the storage device to hold the data being written. The storage space of the storage device is divided into uniform allocation units, and the allocation of storage space involves assigning one or more allocation units to store data of corresponding sections of the linear file. A very small file may fit entirely within only one allocation unit, but more generally files require the use of multiple allocation units. The file system maintains a table which maps the linear array of the file to the respective allocation units which store the file data.

It is generally desired that files be stored in sets of contiguous or successive allocation units if possible. Disk drives are relatively slow at providing random access to allocation units, whereas a set of contiguous allocation units can be transferred at very high speed after an initial delay associated with positioning a mechanical transducer. When a file is stored in two or more sets of allocation units that are not contiguous with each other, the file is said to be "fragmented". Excessive fragmentation can reduce file I/O performance by requiring more of the slow positioning operations for each read or write.

There are known techniques that address the issue of file fragmentation. For example, there are software tools that can be used to assess the level of fragmentation of a disk drive and to effect a re-allocation of the storage space to the data files to reduce the level of fragmentation, a process referred to as "defragmenting". However, defragmentation is a resource intensive process that can be lengthy and may adversely affect performance of programs accessing the data. There are also steps that can be taken to reduce the tendency toward fragmentation in the first place. Some file systems provide for user control over the size of the storage allocation unit used by the file system, for example, in order to achieve a desired balance between efficient use of storage resources (promoted by smaller allocation units) and low fragmentation (generally promoted by larger allocation units). Some file systems also provide for allocation in increments larger than a single allocation unit in some circumstances, for example in connection with compressed files.

SUMMARY

Conventional techniques for addressing file fragmentation may not be sufficiently effective in all applications. For example, manipulation of the size of the allocation unit affects all files stored on a given volume, and thus is typically a compromise value that may not adequately address fragmentation of large files in particular. Additionally, even the largest allocation unit sizes employed by file systems may not adequately address fragmentation in certain applications, especially application employing unusually large files. For example, a backup application may consolidate data into compressed backup files each having a size of 1 GB or larger. Even using a relatively large allocation unit size of 1 MB can result in severe fragmentation, especially if there are multiple independent processes or threads writing multiple files simultaneously.

To achieve reduced file fragmentation in these and similar applications without degrading performance or causing unnecessary consumption of disk resources, the application must cause the operating system or file system to allocate storage in appropriately sized allocations. As a file is being written, the file system will allocate another chunk of disk space whenever the previously allocated space is exhausted. The application must first make the determination of what constitutes an appropriately sized allocation, and this may differ with each file. When the file is opened, the application interacts with the file system to effect the initial allocation. Then, as data is written into the file, the application maintains knowledge of when a new allocation is required and again interacts with the file system to effect the new allocation. The disclosed technique may be particularly applicable in the writing of files whose final length is unknown at the time the file is opened or created.

In the Microsoft NTFS file system, affecting the allocation is a two step process. First the current file position must be positioned such that the file length encompasses the new allocation. Next the space between the last data written and the new end of the file must be declared as valid data belonging to the file. This step is what causes the actual allocation of space to occur and NTFS will allocate a contiguous chunk to extend the file if possible. The last step is to move the indicator of where the next data to be written to the correct position following the last data actually written. One final step to be performed when the file is to be closed (writing is complete) is to move the end of file pointer to the end of the data written to free unused space previously declared as valid data.

The marking of the extended region as holding valid data results in allocation of allocation units to store the data in the region, and these will generally be a set of contiguous or consecutive allocation units if such a set is available to the file system. By this technique, an application (such as a backup application) can obtain a larger contiguous unit of allocation than that typically provided by the file system acting alone. The technique is particularly beneficial when there are multiple independent processes or threads performing file I/O and requesting allocations at the same time. Under such operating conditions using prior techniques or the default file system behavior, successive allocation units tend to be distributed among the different active processes/threads, resulting in relative fragmentation at the granularity of the allocation unit size. The disclosed technique effectively increases the amount of contiguous space allocated as part of each allocation operation, so that even the collective action of multiple independent threads/processes does not result in fragmentation at the granularity of the default allocation unit size. Additionally, the technique can be applied selectively to different files of a volume, so that a better overall trade-off between space efficiency and fragmentation can be obtained. In particular, the size of the application allocation unit may be selected based on some attribute of a file which indicates an expected size and/or use, so that allocation can be tailored accordingly.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
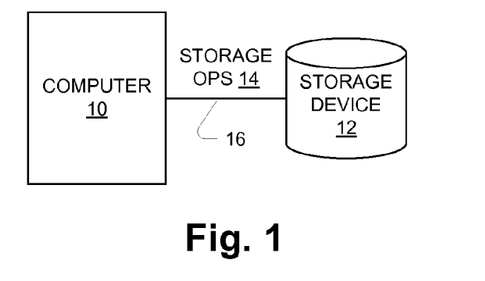
FIG. 1 is a block diagram of a data processing system.

FIG. 1 shows a data processing system including a computer 10 coupled to a storage device 12. The computer 10 is the initiator of storage operations 14 directed to the storage device 12 over an interconnection 16. Data is written to and read from the storage device 12 in sets of "blocks" of fixed size, such as 512 bytes. The storage device 12 may be any of a variety of types and of varying size and complexity. For example, it may include a single magnetic disk drive and associated controller, closely coupled to the computer 10 both mechanically and electrically (e.g., residing in the same cabinet and connected by a high-speed internal bus). Alternatively, it may be a large storage system having numerous disks and controllers providing storage for a large, multi-computer data processing system. Similarly, the computer 10 may be of a variety of types and complexities, including a single-processor personal computer or one or more large server-type machines having numerous processors and large memories.

Figure 2:
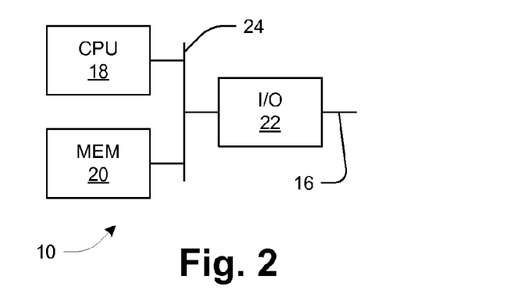
FIG. 2 is a block diagram of a computer.

FIG. 2 shows an example of a computer 10 which includes a processor (CPU) 18, memory 20, and input/output (I/O) circuitry 22 interconnected by one or more data transfer buses 24. The I/O circuitry 22 includes an interface to the interconnection 16.

Figure 3:
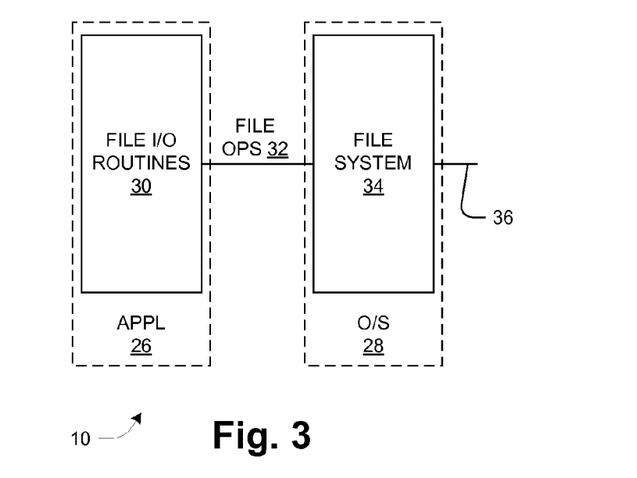
FIG. 3 is a block diagram of a software structure of a computer.

FIG. 3 shows the computer 10 from a software perspective. The software includes at least one application 26 and an operating system or O/S 28. The application 26 executes file I/O routines 30 for writing data to or reading data from a data file which is stored on the storage device 12. The file I/O routines 30 generate file operations 32 which are processed by a file system 34 of the O/S 28, which has an interface 36 to the storage device 12.

As known in the art, the file I/O routines 30 treat the file as a linear array of data, using a pointer and a length value to identify a location and an amount of data to be transferred to or from the file. As an example, a file I/O routine 30 may generate a data write operation 32 which has the following syntax:

WriteFile (Handle, Buffer, Length)

where Handle is an identifier of the file, Buffer is an identifier of a data buffer stored in memory 20 containing the data to be written, and Length identifies the amount of data to be written. In the case of a write, the location of the write is implicitly identified by a file pointer maintained by the file system 34. The file pointer typically points to a location just after the end of the existing data of the file, so each write operation is effectively an "append" operation adding data at the end of the file, and on completion of each write the file pointer is advanced to the end of the newly written data. File read operations are typically similar.

Figure 4:
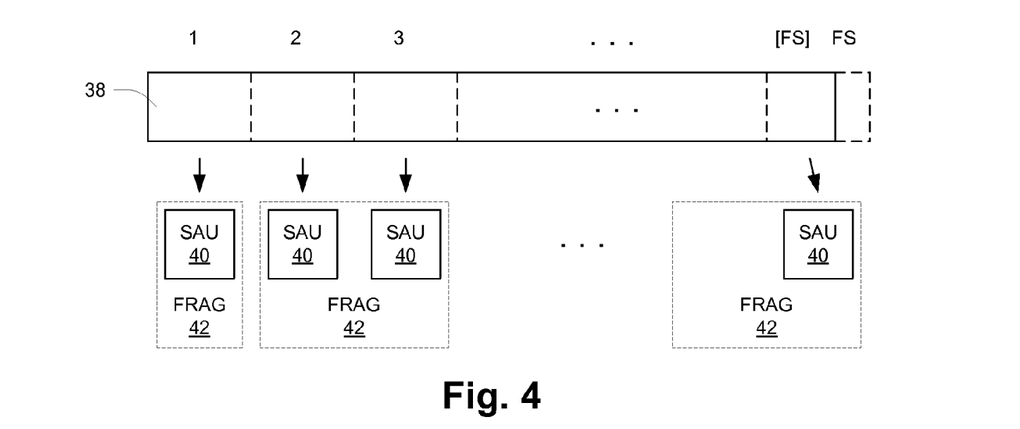
FIG. 4 is a diagram illustrating a relationship between a file and system allocation units of storage.

FIG. 4 illustrates one conventional aspect of operation of the file system 34. A file 38 is shown as a contiguous linear array of data having a file size shown as FS. The file system 34 stores the file on the storage device 12 as a set of discrete fixed-size blocks or chunks shown as "system allocation units" or SAUs 40. An SAU 40 is the fundamental unit of allocation of storage space by the file system 34. That is, the linear file 38 is actually stored as a set of SAUs 40 which are allocated by the file system 34 during creation and modification of the file 38. The size of an SAU 40 can vary among different computers 10. In the Windows® family of computers, an SAU 40 is referred to as a "cluster" and has a size in the range of 512 bytes to 64 k bytes (configurable for a volume based on overall volume capacity and characteristics of the data files). A mapping of SAUs 40 to the blocks of the storage device 12 is made during an initialization of the storage device 12 by the file system 34, and re-mapping can occur in the case of detection of bad blocks, etc. For reference purposes, in FIG. 4 the portions of the file 38 mapping to different SAUs 40 are separated by dotted vertical lines, and these portions are numbered from 1 to [FS] as shown. Recall that FS refers to the file size, typically in bytes. The quantity [FS] in FIG. 4 is the number of SAUs 40 required to store the file 38.

As generally known in the art, the set of SAUs 40 assigned to a given file 38 need not be contiguous (i.e., they do not span a contiguous range of storage block addresses). Storing a file 38 on two or more non-contiguous sets of SAUs 40 is referred to as "fragmentation", and such a file 38 is referred to as "fragmented". For present purposes each set of contiguous SAUs 40 of a fragmented file is referred to as a "fragment". FIG. 4 shows that the file 38 is stored as several fragments 42, where it is understood that the SAUs 40 of different fragments are generally not contiguous with each other. As generally known in the art, file fragmentation can result in reduced performance of a computer 10. An access to data on a disk-oriented storage device 12 involves two operations, one being a "seek" or positioning operation which is slow and provides no data transfer, and a subsequent high-speed data transfer. When a file is fragmented there is a greater likelihood that multiple seeks may be required for a single access, increasing latency and reducing transfer efficiency (throughput).

To reduce file fragmentation, operating systems may attempt to allocate contiguous sets of SAUs 40 for storing data of a file at least under some circumstances. As a general matter, SAUs 40 may be allocated by a file system in a linear fashion, which naturally leads to the use of contiguous SAUs 40 by a single process or application 26. However, in a multi-threaded or multiprocessing environment, there may be a tendency for successive SAUs 40 to be allocated to different threads or processes, resulting in fragmentation. A file system might perform allocation in small groups of contiguous SAUs 40 under particular circumstances. For example, if a file write operation has a length spanning multiple SAUs 40, then a group of contiguous SAUs 40 might be allocated for that write. In another example, some file systems such as the NT file system (NTFS) provide data compression as a way to make more efficient use of physical storage space. Compression is particularly well suited for use with large files that are not accessed often, such as backup files. Thus when using file compression and its underlying assumption of large file size, NTFS attempts to allocate space in segments or extents spanning sixteen contiguous SAUs 40. For large volumes, NTFS may use an SAU size of 64 KB, in which case the extents are 1 MB (16×64 k) in size. This manner of allocation can substantially reduce fragmentation of large files. Nonetheless, fragmentation can still be a problem in complex multi-processing systems using very large files (e.g., files much larger than 1 MB).

Figure 5:
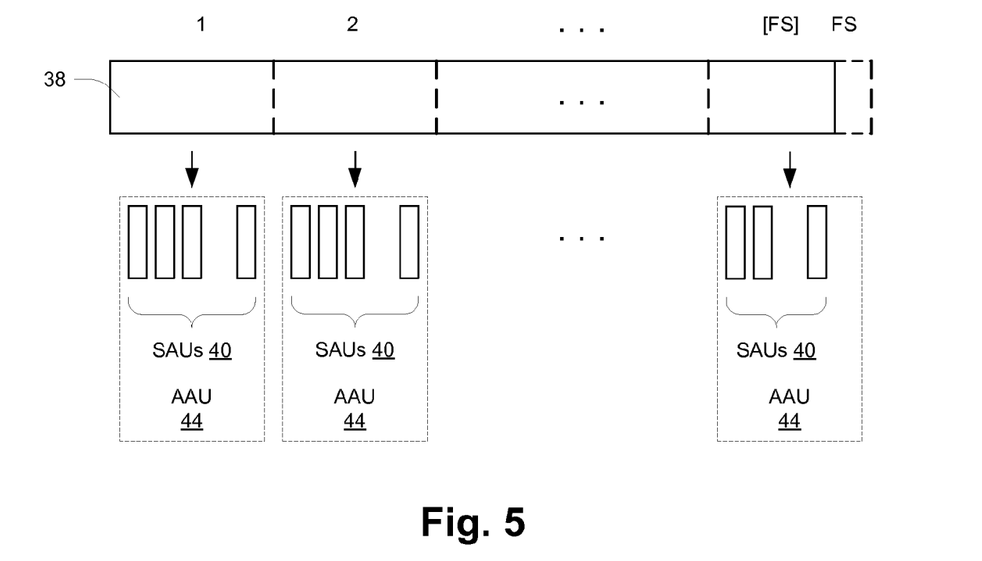
FIG. 5 is a diagram illustrating a relationship between a file and application allocation units of storage.

FIG. 5 illustrates a technique for promoting the allocation of sets of contiguous SAUs 40 for very large files, i.e., for files whose size is many multiples (i.e., more than ten) of the size of an SAU 40. The technique involves explicit action of the application 26. Specifically, the application 26 takes explicit action to promote allocation of contiguous SAUs 40 in sets referred to as "application allocation units" or AAUs 44. The SAUs 40 within an AAU 44 are contiguous, whereas the SAUs 40 of different AAU 44 are generally not contiguous. In one embodiment for the processing of large files (1 GB or larger), the size of an AAU 44 is 64 MB (1,024 SAUs of 64 KB each). The size of the AAU can be application-specific. Generally, it makes sense for the AAU size to be substantially larger than whatever normal or default unit of allocation is used by the file system 34. Thus, an AAU should be larger than an SAU 40 and larger than any segment or extent of contiguous SAUs 40 that the file system 34 might use for allocation, such as in the case of compressed files as discussed above. At a minimum, the size of an AAU 44 is at least twice the size of an SAU 40, and more preferably is at least tens times the size of an SAU 40.

Figure 6:
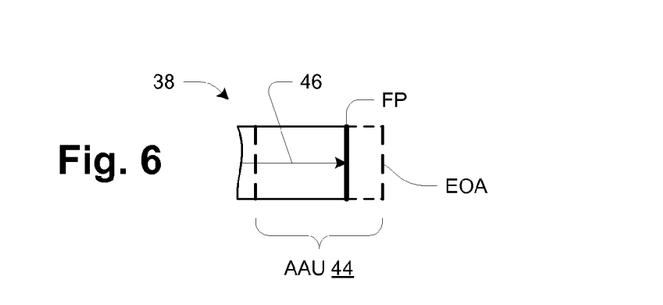
FIGS. 6 and 7 are schematic illustrations of an end part of a file before and after a data write operation.
Figure 7:
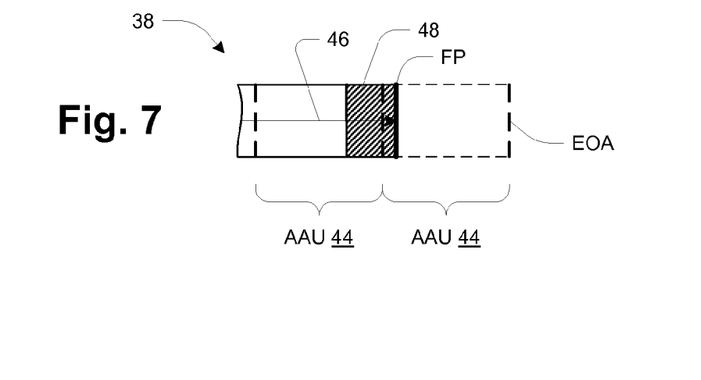

FIGS. 6 and 7 provide a high-level description of a write to a file with incremental application-assisted allocation as described more fully herein below. FIG. 6 shows an initial condition in which the file 38 has data up to a certain location as indicated by an arrow 46 as well as the location of a "file pointer" FP. This end portion of the file 38 is assumed to consume part but not all of an AAU 44, and this end-most AAU 44 has an endpoint which is referred to as the "end of allocation" or EOA. An explanation is provided below of how AAUs 44 come to be allocated to a file 38. For the purpose of clear illustration, the following represents an example of pertinent values that could be reflected by FIG. 6:

File size: 937 MB
AAU size: 64 MB
Number N of AAUs occupied by file: 15
EOA (=N*AAU size): 960 MB
Unused portion of last AAU (=EOA−file size): 23 MB FIG. 7 shows the result of performing write operation(s) that extend the size of the file 38. It is assumed that one or more write data operations are performed to write an amount of new data 48 that is greater than the unused portion of the last AAU 44 occupied by the file 38 (e.g., more than 23 MB in the above example). Before the new data 48 is written, operations are performed which result in allocation of another AAU 44, moving the EOA to the end of the new AAU 44 as shown in FIG. 7. Then the new data 48 is written starting at the current position of the FP as shown in FIG. 6, resulting in the extension of the file into the new AAU 44 and the moving of the FP to the end of the newly written data as shown in FIG. 7. At this point, subsequent writes can be performed into the new AAU 44 until it is filled and it becomes necessary to perform another allocation.

Figure 8:
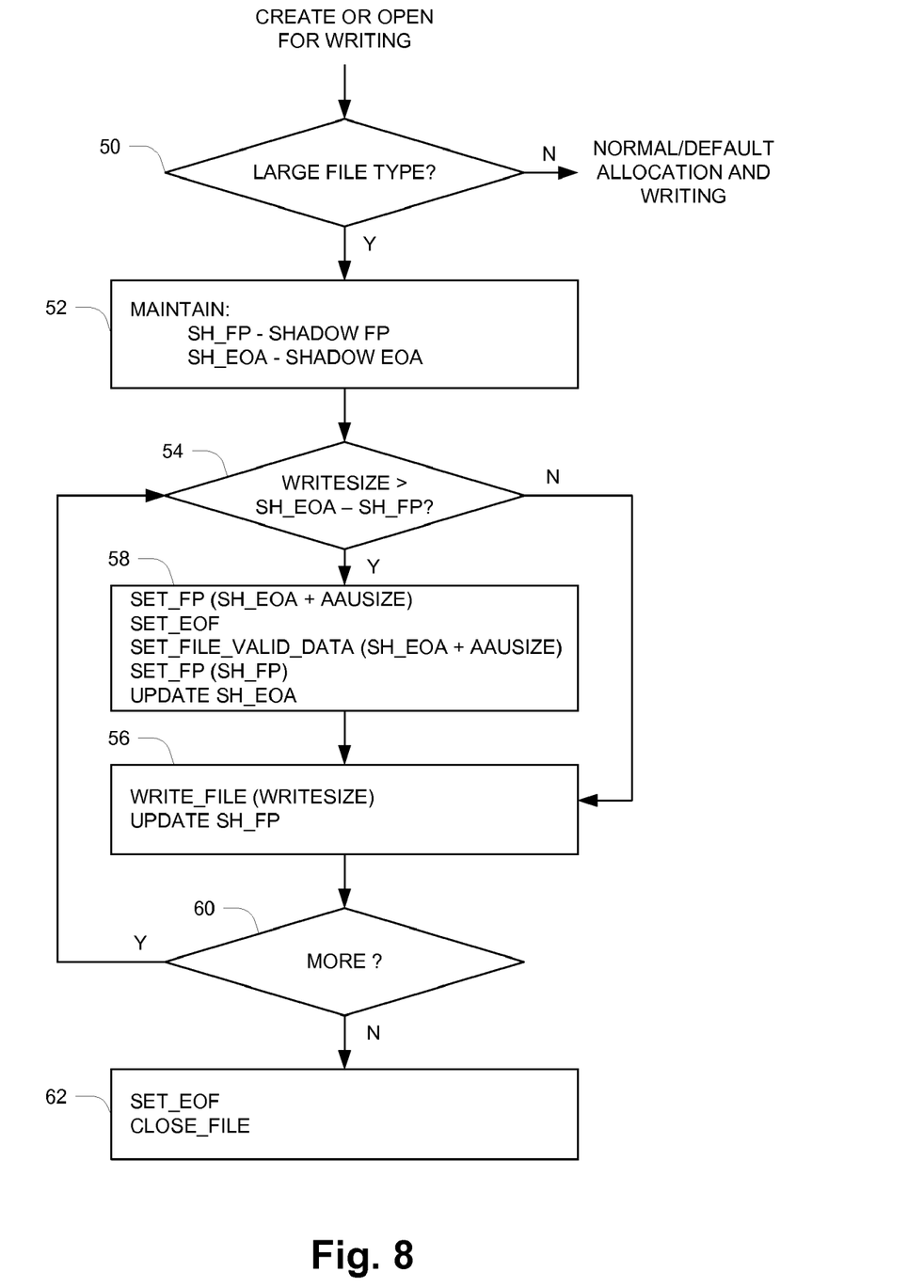
FIG. 8 is a flow diagram of a method of performing application-assisted storage allocation and data writing.

FIG. 8 is a flow diagram of a process which achieves the operation described above with reference to FIGS. 6 and 7. The process is performed when a file is either created or opened for writing. At 50 it is determined whether the file is a large file type which can benefit from application-assisted allocation. As noted above, the technique is beneficial for files that are generally many times larger than the size of the SAU 44. Specific examples of such file types are discussed below. If the file is not a large file type, then normal or default allocation and writing can be used, and so the remaining steps of the process of FIG. 8 are not performed. If the file is a large file type, then the process proceeds to step 52 as shown.

In step 52, the application 26 maintains both a shadow file pointer (SH_FP) and a shadow "end of allocation" (SH_EOA) value for the file. The SH_FP is maintained so as to track (i.e. be equal to) the value of the file pointer FP used by the file system 34, and similarly the SH_EOA is maintained so as to track the value of the EOA used by the file system 34.

At step 54, the application 26 compares a value WRITESIZE (which is the size of the present write operation) to the difference between SH_EOA and SH_FP, which represents the amount of previously allocated space available for writing. If WRITESIZE is less than or equal to this difference, then there is sufficient allocated space for the write and so the write is performed by execution of a WRITE_FILE command at step 56. Otherwise, there is insufficient allocated space for the write and it is necessary to allocate additional space. In this case, a sequence of operations is performed at step 58. The operations and their respective effects are as described below.

Figure 9:
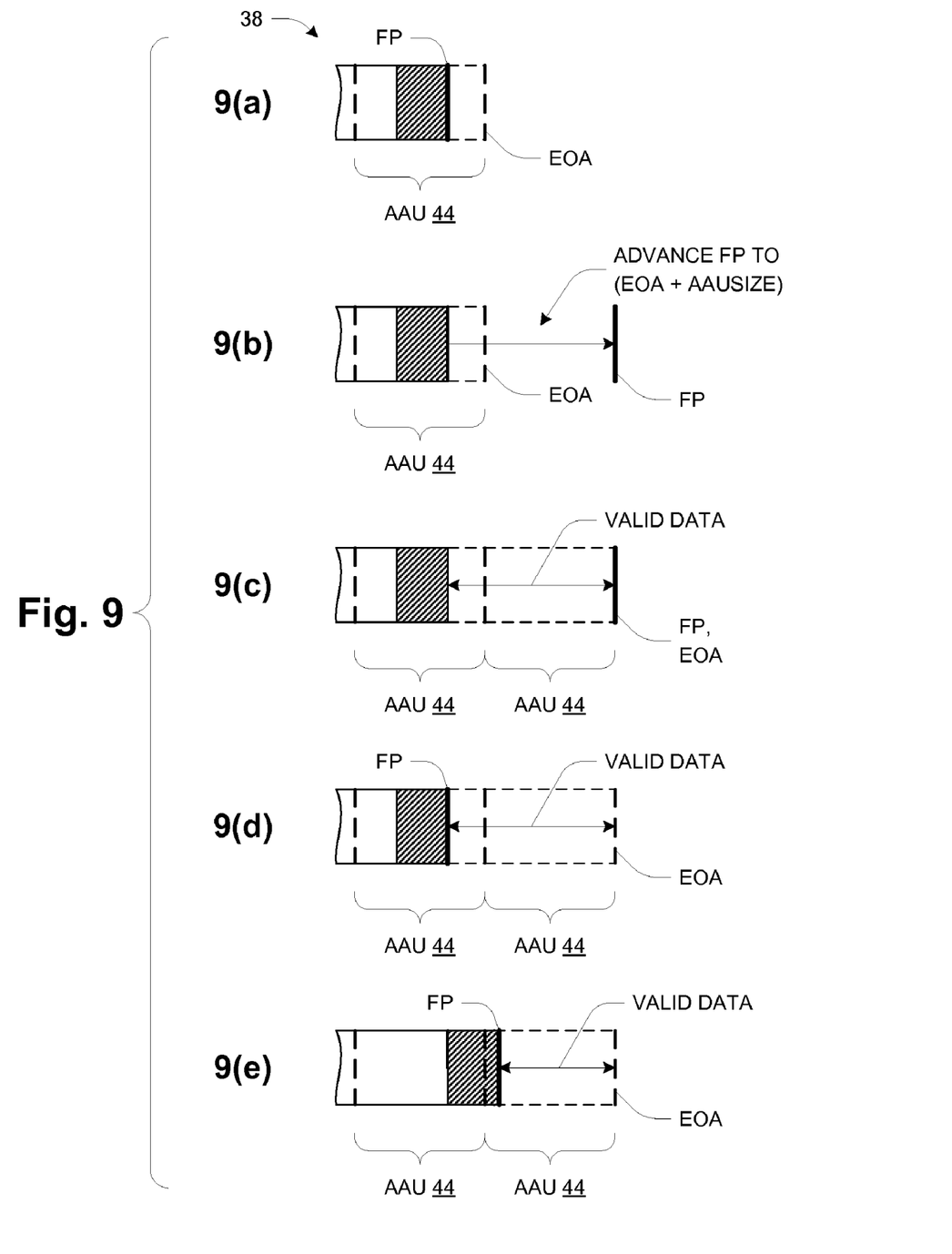
FIG. 9, which consists of FIGS. 9(a) through 9(e), is a schematic illustration of an end part of a file during the allocation and writing of FIG. 8.

The following description also makes reference to FIG. 9 which illustrates the pertinent values as they change during the process. FIG. 9(a) shows the end of a file 38 at a presumed initial condition in which the file data extends into an AAU 44 to a point identified by the FP, which is less than the current EOA. This is similar to the condition shown in FIG. 6. The hashing indicates the data of the most recent write operation.

Referring again to FIG. 8, step 58 includes the following:
1. SET_FP (SH_EOA+AAUSIZE)
    This command causes the FP of the file system 34 to be set to a value equal to the sum of the current EOA and the size of the AAU 44. The result is illustrated in FIG. 9(b). The FP moves beyond the current EOA by the size of an AAU 44.
2. SET_EOF Followed by SET_FILE_VALID_DATA (SH_EOA+AAUSIZE)
    This sequence of commands first causes the end of file (EOF) marker to be set to the same extended value as the FP as shown in FIG. 9(b), and then for all the data between the EOA and the EOF marker to be marked as valid. The result is as shown in FIG. 9(c). As part of this operation, the file system 34 performs an allocation of a set of SAUs 40 to the new AAU 44. Because this allocation is done as part of a single SET_FILE_VALID_DATA operation, the file system 34 allocates a continuous set of SAUs 40 if possible.
3. SET_FP (SH_FP)
    This command restores the FP to its initial value at the end of the existing data, as illustrated in FIG. 9(d). At this point the application 26 can perform writes knowing that it has reserved a large AAU 44 of contiguous SAUs 40. Also, the SH_EOA is updated to be equal to the new value of EOA.

Upon completion of step 58, the application 26 proceeds to perform the write in step 56. The result is as shown in FIG. 9(e), where the written data is indicated by the hashing and it can be seen that the file now extends into the new AAU 44. This condition is similar to that shown in FIG. 7. As previously noted, the two adjacent AAUs 44 are generally not contiguous, but generally all the SAUs 40 within an AAU 44 are contiguous, and so fragmentation is reduced accordingly. At this point, the SH_FP is updated to be equal to the new value of the FP.

At step 60 the application 26 determines whether there are additional writes to be performed, and if so then the process repeats for each additional write beginning at step 54 as shown. When no additional writes are to be performed, then at step 62 a SET_EOF is performed and the file is closed (CLOSE_FILE). The SET_EOF command sets the EOF marker to the current value of the FP, which in this condition is at the end of the existing data. Any allocated but unused SAUs 40 are made available for use for other files.

Figure 10:
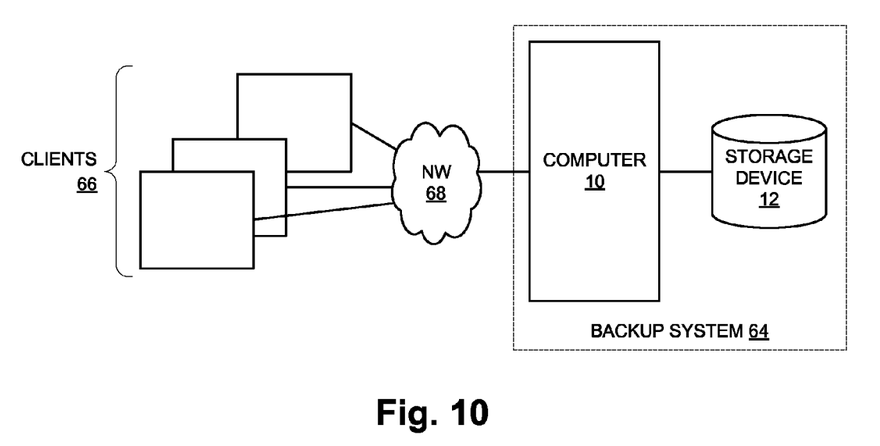
FIG. 10 is a block diagram of a data processing system.

FIG. 10 shows a particular application of the above-described allocation technique. The computer 10 and storage device 12 of FIG. 1 are part of a backup system 64 which provides file backup and restoration services to a set of client computers (CLIENTS) 66 which may be coupled to the backup system 64 by a network 68 for example. In this context, the backup system 64 may consolidate numerous backups from the respective clients 66 to one or more large files which are stored on the storage device 12. For example, a backup of all the files for a particular client 66 at a particular point in time may be saved as a single large file. It will be appreciated that an application of this type which utilizes large files may benefit from the reduction of file fragmentation that can occur with the disclosed technique.

In particular, the backup system 64 may operate in a multi-processing manner in which separate processes are operated concurrently to perform backups for different clients 66. In this case, there would be a tendency toward relatively fragmented allocation of storage space among the different processes which perform file I/O operations independently. By using the disclosed technique, the fragmentation can be reduced at least to the granularity of the relatively large AAU 44 rather than the much smaller SAU 40 or similar allocation unit used by the file system 34.

In the context of a backup application, the "large file type" referred to in FIG. 8 may be the file type used to store the backup data. If the backup system 64 uses a consistent file naming convention, it can be possible to determine the large file type from the file name. If desired, a table or other data structure can be used to represent a mapping between file types (or names) and desired sizes of AAUs 44 for such files. In this case, the determining step 50 of FIG. 8 can be done by referring to this data structure using a suitable identification of the file being written to (e.g., file name or extension).

Figure 11:
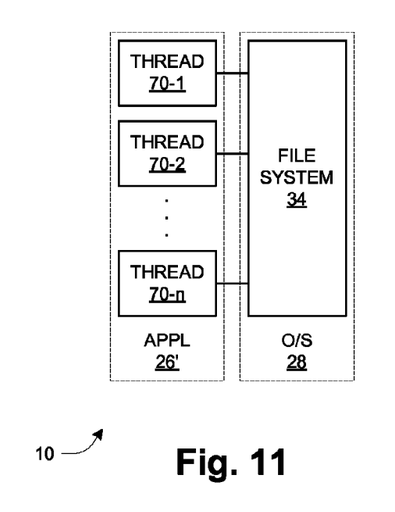
FIG. 11 is a block diagram of a software structure of a computer.

FIG. 11 shows an operating environment in which the application 26' has a multi-threaded nature as illustrated by separate processing threads 70 which operate concurrently. This structure is somewhat analogous to the multi-processing approach discussed above, but in this case the different threads 70 may all be performing file I/O operations to a single file (such as a large backup file). Here again it will be appreciated that without the use of specialized techniques then relatively high fragmentation is likely to occur. For example, if five threads 70 are all writing to different files concurrently, then standard allocation by the file system 34 may result in an allocation pattern such as shown below, with severe fragmentation at a granularity of a single SAU 40. In this simplified example it is assumed that ten threads are writing concurrently to different files. The example shows that the SAUs containing data from one file are interspersed with the SAUs of the other ten files:

File logical sequence: 1, 2, 3, 4, 5, 6, 7, 8, 9, 10, . . .
Sequence of SAUs: 1, 11, 21, 31, 41, 2, 12, 22, 32, 42, . . .

A sequential read of such a fragmented file might necessitate an unduly large number of seek operations. If each thread 70 employs the pre-allocation technique described above, then much larger areas of sequentiality can be maintained, reducing the need for seek operations.

It should be noted that in a multi-threaded application 26' it may be desired or necessary to implement data write operations to include an explicit movement of the FP to a desired starting point for each write or set of writes, in order to avoid having one thread 70 inadvertently write data at an improper location (e.g., in a location reserved for use by a different thread 70). The file system 34 maintains only one FP, which by default is pointing to a location just after the end of the most recently written data. When multiple threads 70 are employed, each must be able to move the FP to an area being written to by that thread. This can be accomplished if an application 26 performs a seek command before each write command. The seek command causes the FP to be moved to the desired location, then the write command causes the data to be written at the location of the FP. When this kind of technique is used, then the application-assisted allocation such as described above with reference to FIG. 8 can be triggered by the seek command, specifically by a seek command which moves the FP past the current EOA. In this case the seek command triggers the allocation of an AAU 44 as described above, and then the subsequent write operation utilizes storage space from the newly allocated AAU 44.

While various embodiments of the invention have been particularly shown and described, it will be understood by those skilled in the art that various changes in form and details may be made therein without departing from the spirit and scope of the invention as defined by the appended claims.

What is claimed is:

1. A method by which a data processing system stores data in a data file, comprising:
    identifying the data file as a large file type known to require an amount of storage space substantially greater than a system allocation unit size employed by a file system of the data processing system;
    as data is to be written to the data file beginning at a location identified by a file pointer, determining whether it is necessary to allocate storage space of the data processing system to store the data to be written, and if so then issuing commands to the file system including (i) one or more first commands to set an end of file marker for the data file to a new value greater than a current value of the end of file marker by at least an application allocation unit size which is at least twice the system allocation unit size, and (ii) one or more second commands to mark a region of the data file extending between the current and new values of the end of file marker as holding valid data; and
    subsequently writing the data to the data file at the location identified by the file pointer.

2. A method according to claim 1, wherein the one or more first commands include (1) a set file pointer command to advance the file pointer from a current value to an advanced value equal to the new value of the end of file marker, and (2) a set end of file command to set the end of file marker equal to the file pointer, and wherein the commands issued to the file system further include (iii) a third command to return the file pointer to the current value.

3. A method according to claim 1, wherein data is written to the data file using a seek command paired with a write data command, the seek command indicating that the file pointer is to be moved to the location so that data written by the write data command is written beginning at the location, and wherein the determining and command-issuing is performed in response to the seek command when the location is beyond a current end of allocation for the data file.

4. A method according to claim 3, wherein data is written to the data file in a multi-threaded fashion in which different processing threads write data to different sections of the data file, and wherein each processing thread uses the seek command to explicitly control the file pointer to avoid writing data to a section of the data file being used by a different processing thread.

5. A method according to claim 1, wherein data processing system is a backup system which consolidates backup data from one or more client computers into the data file, and wherein the determining includes determining that the data file is a backup data type of file which stores the backup data from the client computers.

6. A method according to claim 5, wherein the backup system employs a consistent file naming convention under which the backup data type of file has a file name distinct from other types of files, and wherein determining that the data file is a backup data type of file includes determining that the data file has the distinct file name.

7. A data processing system, comprising:
a storage device operative to store data files; and
a computer executing (i) an operating system including a file system, and (ii) an application operative to store data in a data file to be stored on the storage device by:
identifying the data file as a large file type known to require an amount of storage space substantially greater than a system allocation unit size employed by the file system;
as data is to be written to the data file beginning at a location identified by a file pointer, determining whether it is necessary to allocate storage space of the data processing system to store the data to be written, and if so then issuing commands to the file system including (i) one or more first commands to set an end of file marker for the data file to a new value greater than a current value of the end of file marker by at least an application allocation unit size which is at least twice the system allocation unit size, and (ii) one or more second commands to mark a region of the data file extending between the current and new values of the end of file marker as holding valid data; and
subsequently writing the data to the data file at the location identified by the file pointer.

8. A data processing system according to claim 7, wherein the one or more first commands include (1) a set file pointer command to advance the file pointer from a current value to an advanced value equal to the new value of the end of file marker, and (2) a set end of file command to set the end of file marker equal to the file pointer, and wherein the commands issued to the file system further include (iii) a third command to return the file pointer to the current value.

9. A data processing system according to claim 7, wherein data is written to the data file using a seek command paired with a write data command, the seek command indicating that the file pointer is to be moved to the location so that data written by the write data command is written beginning at the location, and wherein the determining and command-issuing is performed in response to the seek command when the location is beyond a current end of allocation for the data file.

10. A data processing system according to claim 9, wherein data is written to the data file in a multi-threaded fashion in which different processing threads write data to different sections of the data file, and wherein each processing thread uses the seek command to explicitly control the file pointer to avoid writing data to a section of the data file being used by a different processing thread.

11. A data processing system according to claim 7, wherein data processing system is a backup system which consolidates backup data from one or more client computers into the data file, and wherein the determining includes determining that the data file is a backup data type of file which stores the backup data from the client computers.

12. A data processing system according to claim 11, wherein the backup system employs a consistent file naming convention under which the backup data type of file has a file name distinct from other types of files, and wherein determining that the data file is a backup data type of file includes determining that the data file has the distinct file name.

* * * * *